United States Patent
Cheng et al.

(10) Patent No.: US 12,147,522 B2
(45) Date of Patent: Nov. 19, 2024

(54) ALTERNATIVE IDENTITY VERIFICATION AND AUTHORIZATION METHOD

(71) Applicant: Capital One Services, LLC, McLean, VA (US)

(72) Inventors: Lin Ni Lisa Cheng, New York, NY (US); Asher Smith-Rose, Arlington, VA (US); Tyler Maiman, Melville, NY (US); Shabnam Kousha, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 279 days.

(21) Appl. No.: 17/530,130

(22) Filed: Nov. 18, 2021

(65) Prior Publication Data

US 2023/0153415 A1     May 18, 2023

(51) Int. Cl.
| | |
|---|---|
| *G06F 21/34* | (2013.01) |
| *G06F 21/32* | (2013.01) |
| *G06F 21/45* | (2013.01) |
| *G06N 20/00* | (2019.01) |

(52) U.S. Cl.
CPC .............. *G06F 21/34* (2013.01); *G06F 21/32* (2013.01); *G06F 21/45* (2013.01); *G06N 20/00* (2019.01); *G06F 2221/2113* (2013.01)

(58) Field of Classification Search
CPC .......... G06F 21/32; G06F 21/34; G06F 21/45; G06F 2221/2113; G06N 20/00
See application file for complete search history.

(56) References Cited

U.S. PATENT DOCUMENTS

| | | | |
|---|---|---|---|
| 9,342,677 B2 | 5/2016 | Ali et al. | |
| 9,430,625 B1* | 8/2016 | Gador | G06F 21/32 |
| 9,781,105 B2 | 10/2017 | Weiner et al. | |
| 9,881,303 B2 | 1/2018 | Vohra et al. | |
| 9,904,775 B2 | 2/2018 | Salama et al. | |
| 2012/0144468 A1* | 6/2012 | Pratt | H04L 9/3271 |
| | | | 726/7 |
| 2014/0250523 A1* | 9/2014 | Savvides | G06F 21/32 |
| | | | 726/19 |
| 2016/0055487 A1 | 2/2016 | Votaw et al. | |
| 2017/0228525 A1 | 8/2017 | Wajs et al. | |
| 2017/0345001 A1 | 11/2017 | Castinado et al. | |

(Continued)

*Primary Examiner* — Daniel B Potratz
*Assistant Examiner* — Matthias Habtegeorgis
(74) *Attorney, Agent, or Firm* — Foley & Lardner LLP

(57) ABSTRACT

Systems, methods, and non-transitory computer readable medium disclosed herein relate to identity verification and authorization method. In one embodiment, the system can generate and send a message to a device associated with a user based on an initiated request from the user and a determination the user should be authenticated, wherein the message requests a content-based response from the user to authenticate the user. In another embodiment, the system can receive the content-based response from the user in reply to the message, wherein the content-based response comprises SMS (short message service) metadata, emoji, photo, video, audio, or a combination thereof. In another embodiment, the system can authenticate the user based on a determination of a confirmed match between the content-based response from the user and a response key preselected by the user.

16 Claims, 11 Drawing Sheets

(56) References Cited

U.S. PATENT DOCUMENTS

| | | | |
|---|---|---|---|
| 2017/0372056 A1* | 12/2017 | Narasimhan | G06F 21/32 |
| 2020/0110870 A1* | 4/2020 | Girdhar | G06F 21/316 |
| 2022/0114245 A1* | 4/2022 | Krishan | G06F 21/32 |

* cited by examiner

ALTERNATIVE IDENTITY VERIFICATION AND AUTHORIZATION METHOD

BACKGROUND

Authorization methods can be implemented in various ways such as through web application, mobile application, email, phone call, in person, or SMS (short message service). Web application, mobile application, and email require internet connection or data, which may not always be available. Responding with a passcode over a phone call in a public setting might not be safe. In person authorization can be inconvenient. SMS based authorization methods tend to rely on "yes" or "no" responses and do not verify the identity of the person responding.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

The subject disclosure pertains to systems, methods, and non-transitory computer readable medium relating to identity verification and authorization method. In an embodiment, a system is provided. The system can comprise a processor coupled to a memory that includes instructions that, when executed by the processor, can cause the processor to generate and send a message to a device associated with a user based on an initiated request from the user and a determination the user should be authenticated, wherein the message requests a content-based response from the user to authenticate the user. The instructions can further cause the processor to receive the content-based response from the user in reply to the message, wherein the content-based response can comprise SMS metadata, emoji, photo, video, audio, or a combination thereof. The instructions can further cause the processor to authenticate the user based on a determination of a confirmed match between the content-based response from the user and a response key previously set up by the user.

According to another embodiment, a method is provided. The method can comprise generating and sending a message to a device associated with a user based on an initiated request from the user and a determination the user should be authenticated, wherein the message requests a content-based response from the user to authenticate the user. The method can further comprise receiving the content-based response from the user in reply to the message, wherein the content-based response can comprise SMS metadata, emoji, photo, video, audio, or a combination thereof. The method can further comprise authenticating the user based on a determination of a confirmed match between the content-based response from the user and a response key previously set up by the user.

In another embodiment, a non-transitory computer-readable storage medium is provided. The non-transitory computer-readable storage medium comprising instructions that, in response to execution, can cause a device comprising a processor to perform operations. The operations can comprise receiving an initiated request from a user. The operations can further comprise determining the user should be authenticated based on the initiated request. The operations can further comprise generating and sending a message to a device associated with the user, wherein the message requests a content-based response from the user to authenticate the user. The operations can further comprise receiving the content-based response from the user in reply to the message, wherein the content-based response comprises SMS metadata, emoji, photo, video, audio, or a combination thereof. The operations can further comprise authenticating the user based on a determination of a confirmed match between the content-based response from the user and a response key preselected by the user.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Figure 1:
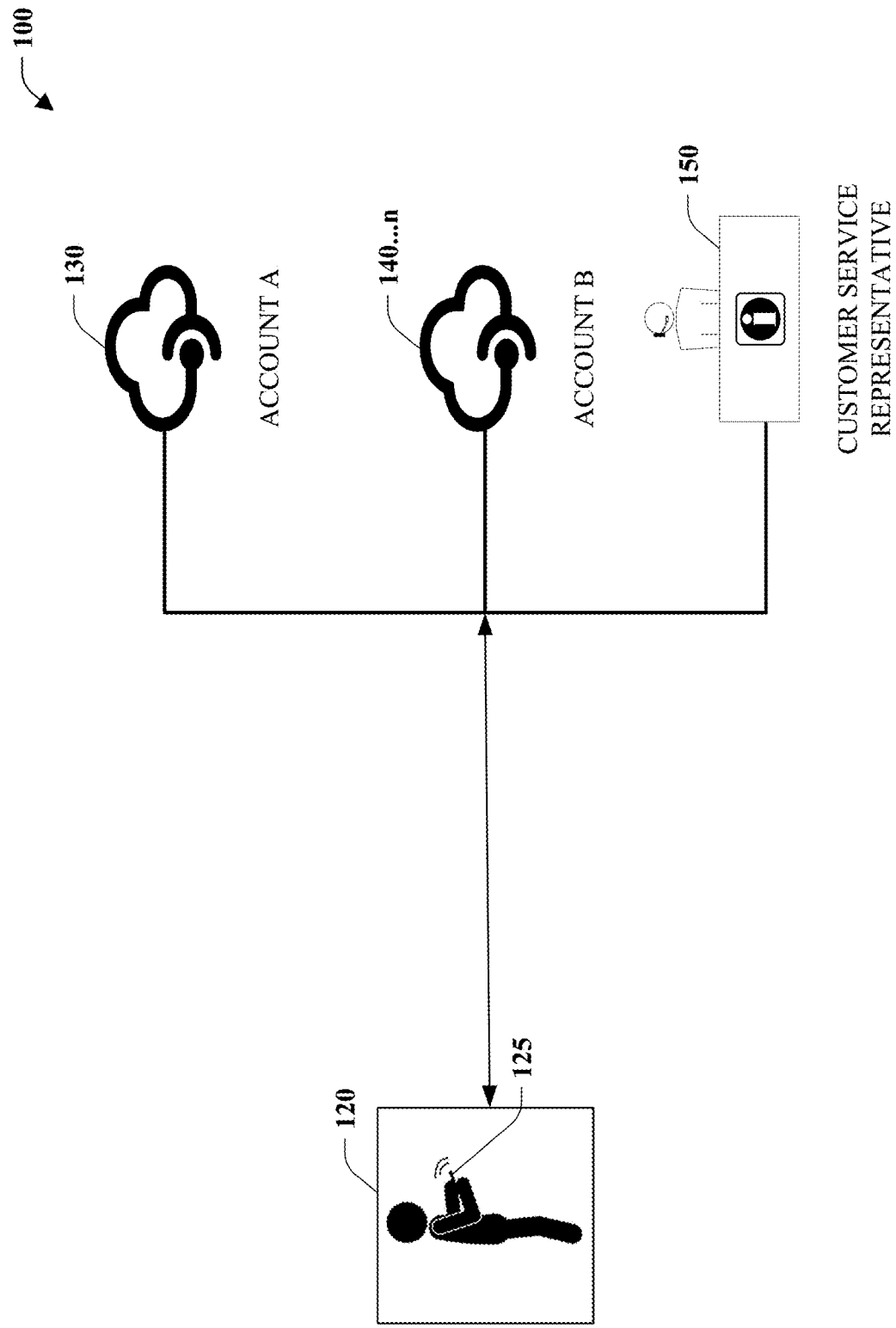
FIG. 1 illustrates an overview of an example implementation.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Details disclosed herein generally pertain to alternative identity verification and authorization method comprising SMS metadata, emoji, photo, video, audio (e.g., voice, music, sounds etc.), or a combination thereof. As used herein, the term authenticate or authentication can mean identity verification and authorization of an account activity. As used herein, the term photo and image can be interchangeable and can include animated GIF (Graphical Interchange Format) image. SMS metadata, photo metadata, video metadata, and audio metadata can be employed to extract data such as, but not limited to, GPS (Global Positioning System) coordinates, date, and time. For example, SMS metadata can include the phone number associated with a text message and the date and time of the text message. In a photo, the metadata can include GPS coordinates indicating the location the photo was taken as well as the date and time.

SMS applications employ multimedia messaging service (MMS) for transferring photos, videos, audios, or anything beyond a text message with emojis. During relay between SMS servers and MMS servers, photos, videos, audio, etc., may be scaled and the original metadata may be retained or replaced. Sent photos and videos that retain their original metadata can then be retrieved. Multimedia messaging (e.g., MMS) rely on 3G (third generation) cellular network technology or newer or Wi-Fi rather than the 2G (second generation) cellular network technology used for text messaging (e.g., SMS). Without cellular data or Wi-Fi, SMS applications cannot use MMS for sending multimedia messages. However, text messaging via SMS applications is still available even when cellular data and Wi-Fi are not available.

Cellular data and Wi-Fi is not always available or reliable, so SMS need to be used. However, sending a text message via an SMS application requesting a yes or no response can be insecure because there is no identity verification. If an unauthorized user has possession of both credit card and mobile phone of the authorized user, the unauthorized user can also authorize a charge by responding yes to a text message asking for a yes or no response as an authorization method. SMS applications also do not support biometric input. Phone calls requesting verification information can lack privacy if the user is in a public setting at the time of the call. Therefore, a more secure and reliable identity verification and authorization method that provides privacy is needed.

Systems, methods, and non-transitory computer readable medium described herein relates to identity verification and authorization method that can utilize SMS metadata, emoji, photo, video, audio, or a combination thereof that is secure, reliable, and provide privacy. The embodiments described herein can utilize SMS metadata and emoji as a basis for identity verification in response to an authorization request while cellular data or Wi-Fi is not available. Being able to authenticate (e.g., provide identity verification) without cellular data or Wi-Fi provides reliability.

An identity verification and authorization method that can utilize SMS metadata, emoji, photo, video, voice, or a combination thereof can provide a secure, reliable, and private way to authenticate. The embodiments herein can comprise creating a response key (e.g., security key) for identity verification, similar to a password, in responding to an authorization request. A response key is a list of preselected contents such as, but not limited to, emoji, photo, video, audio, or a combination thereof that can be used for identity verification in an authorization request. A response key can comprise a single or multiple emoji, photo, video, audio, or a combination thereof. A response key does not have to be a specific response and can be a number of responses that follow a set of rules dictating which types of content-based response (e.g., generally, response) are acceptable. The ability to authenticate the user in an authorization request can provide an extra layer of security protection. There are also additional advantages for employing a response key. Considering that a response key associated with an account is not a password, the password associated with that account is safeguarded. In addition, because a response key is not a password and can include any number of responses that follow a set of rules predetermined by the user, it can be easier to remember.

A request can be sent to the user to create a response key. Alternatively, it is contemplated that a response key can be created within the associated account. The user can log into an account associated with the user to create a response key for that account. A user can send a content-based response that matches the response key in order to authenticate the user and authorize a transaction (e.g., activity, request, etc.).

Machine learning can be employed to determine whether to authenticate a user. Based on security protocols associated with an account or security settings established by a user, machine learning can determine whether a transaction or request need to be authenticated. For example, a security protocol may require authentication for profile change, or the user may request to be authenticated for a monetary transaction over a predetermined amount.

In addition, machine learning also can be employed to match the content-based response to the response key by identifying patterns in the response. In addition to analyzing whether the content-based response matches the response key, machine learning can analyze the metadata in the content-based response (e.g., SMS metadata, photo metadata, video metadata, audio metadata, etc.). For example, machine learning can map out whether a response is a reaction attached to an authorization request (e.g., a message) or a response is sent as a separate message. In another example, if voice is used as an audio, machine learning can analyze the voice pattern in addition to matching the content of the audio along with audio metadata.

Based on a predetermined confidence threshold of the content-based response (e.g., whether there is a match) and metadata, an authorization request can be accepted if the user is authenticated, denied, or determined that re-authorization is required. Machine learning can be employed to determine the confidence score of the content-based response and metadata. The authentication process starts over if re-authorization is needed. In analyzing the content-based response with available metadata, machine learning also can determine that a breach of security has occurred. Machine learning also can be employed to determine whether a response key has weakened, e.g., after a predetermined amount of time. If it is determined that there has been a breach of security or a response key is weakened a request for an updated response key can be sent. A response key can also be updated upon initiation or input from the user.

Referring to FIG. 1, which illustrates an overview of an example implementation 100 comprising user 120, device 125, account A 130, account B 140 . . . *n* (e.g., any number or type of account), and customer service representative 150. If account A 130 is a credit card account, when the user 120 makes a purchase using account A 130, a request for authentication can be sent to the user 120 for the purchase. The authorization request can be sent as a message (e.g., SMS message, MMS message, email, application alert, phone call, etc.) to the device 125 associated with the user 120 requesting a content-based response from the user to authenticate the user 120 (e.g., verify the identity of the user and request authorization of a transaction or request for access to an associated account). Receiving an authentication request via text message (e.g., SMS message) can be convenient and reliable when cellular data and Wi-Fi are not available.

Authentication can be achieved by utilizing a response key. The user 120 can create a response key for account A 130, account B 140 . . . n, etc. The response key can comprise a single or multiple emoji, photo, video, audio, or a combination thereof. The response key can comprise a set of rules detailing items that can or must be included in the content-based response as well as items that must be excluded. For example, the response key can have a set of rules requiring images (e.g., photo or animated GIF images) that include a baby or a dog. Animated GIF images that show a baby or a dog in one small subset of a frame can be difficult to detect by an unauthorized user scrolling through the message's history to try to figure out the response key. However, machine learning can be used to determine a match.

As another example, the response key can have a set of rules that exclude upset emojis, so the content-based response cannot include sad or angry emojis. The response key associated with account A 130 can be used to authenticate the user 120 in response to an authentication request to verify the identity of the user 120 and authorize the purchase. As an additional safeguard, security protocols can require that a content-based response cannot be repeated, for example, until a predetermined number of other content-based response has been used.

Security protocols and security settings associated with account A 130 can determine whether authentication is required and can be based on location of the purchase, amount of the purchase, whether the purchase is made in-person or online, etc. The request for authentication can be based on security protocols within account A 130 in order to prevent unauthorized activities. For example, security protocols associated with the account A 130 can require authentication for transactions outside of a geographical location. Requests for authentication can also be based on security settings established by the user 120 for the account A 130. For example, the user 120 may have a security setting requiring authentication to occur for all credit card transactions associated with account A 130 above a predetermined monetary amount. As another example, the user 120 may have a security setting requiring authentication to occur every time account A 130 is being accessed or a change is made.

Similarly, if the user 120 tries to access account B 140 . . . n, an alert can be sent to the user 120 requesting authentication. Account B 140 . . . n can be any number or type of account. The type of account can determine the standard for authentication requirements. For example, a profile change associated with a credit card account may require a more complicated content-based response for a request for authentication than a profile change in a social media account.

In another embodiment, while on the phone with customer service representative 150 associated with another account or associated with account A 130 or account B 140 . . . n, the customer service representative 150 can ask the user 120 security questions to authenticate the user 120. The user 120 can have the option to answer the security question directly to the customer service representative 150 or utilize the identity verification and authorization method described herein. If the user 120 is in a public setting, the user 120 may prefer not to speak aloud identifying information for proof of identity. The user 120 can ask the customer service representative 150 to send an authorization request (e.g., a message) to the device 125 associated with the user 120. The customer service representative 150 can also ask the user 120 whether the user 120 would like an authentication request be sent to the user 120.

Figure 2:
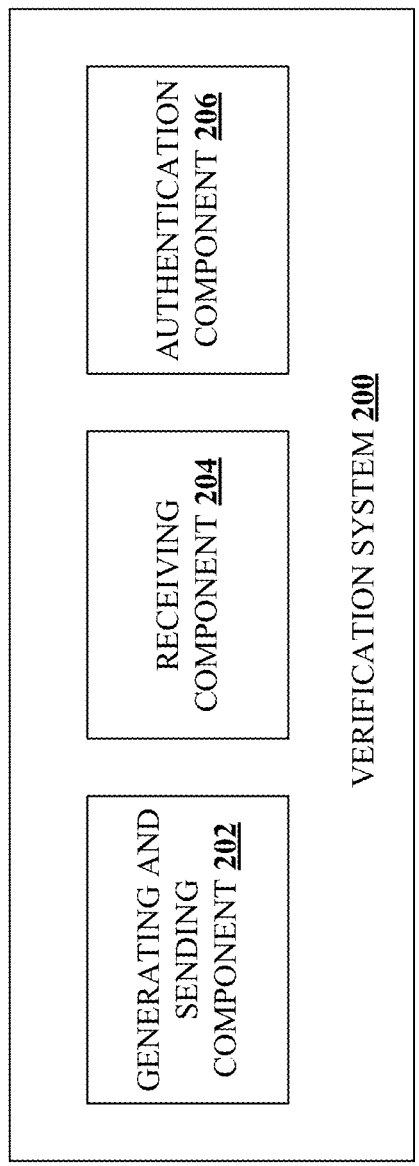
FIG. 2 is a block diagram illustrating an example verification system.

FIG. 2 is a block diagram illustrating an example verification system 200. The verification system 200 can comprise generating and sending component 202, receiving component 204, and authentication component 206. The generating and sending component 202 can generate and send a message to the device 125 associated with the user 120 based on an initiated request from the user 120 to access or make a charge on account A 130 or account B 140 . . . n or through customer service representative 150. Based on a determination the user 120 should be authenticated, the generating and sending component 202 can send a message (e.g., an authentication request) to the user 120 requesting a content-based response from the user 120 to authenticate the user 120 and authorize a transaction (e.g., an account activity).

In response to an authentication request, the user 120 can reply with a content-based response, which can be received by the receiving component 204. The content-based response can comprise one or more SMS metadata, emoji, photo, video, audio, or a combination thereof. In addition, the content-based response can also comprise photo metadata, video metadata, and audio metadata. The content-based response can be a single response or multiple responses such as two separate replies. Based on a determination of a confirmed match between the content-based response from the user 120 and a response key preselected by the user 120, the authentication component 206 can authenticate the user 120 thereby authorizing a transaction or an account activity.

Figure 3:
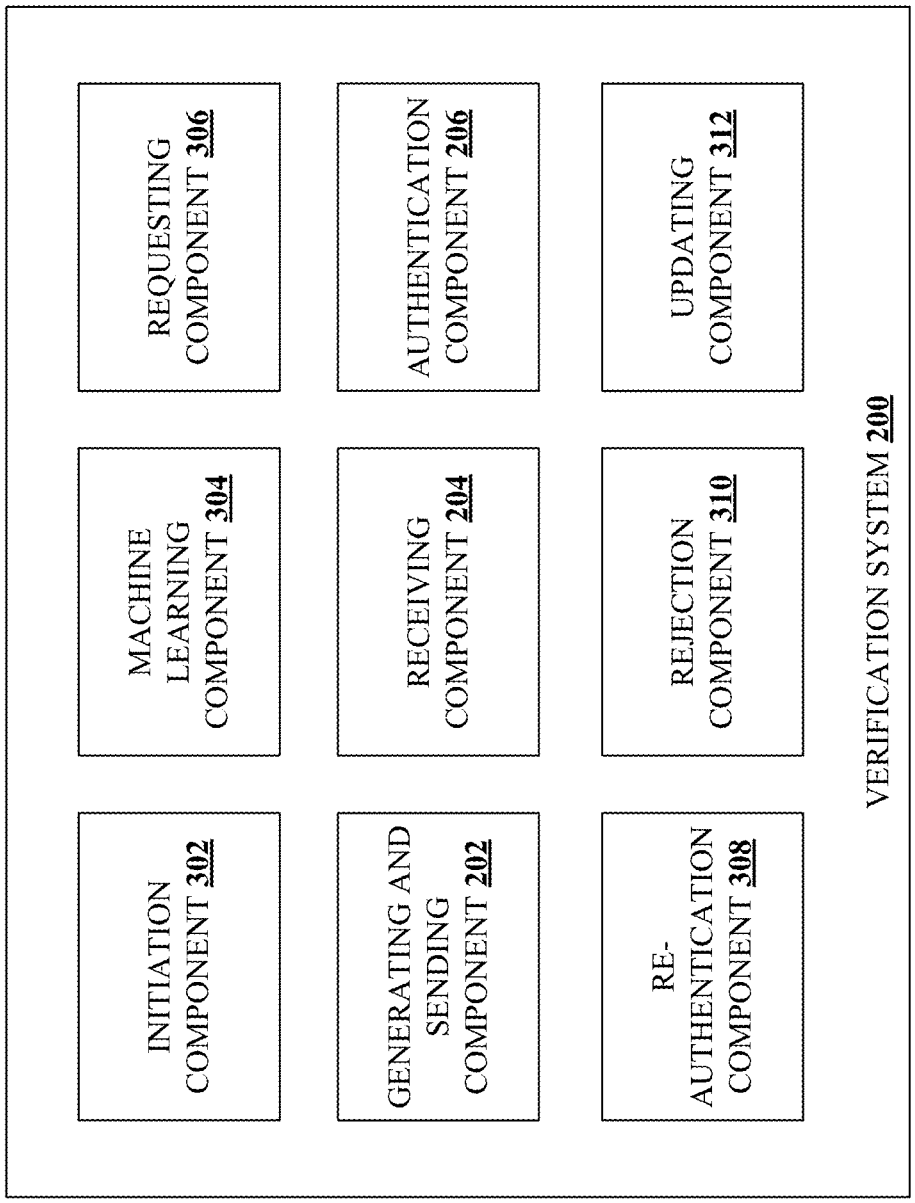
FIG. 3 is a block diagram illustrating another example verification system.

FIG. 3 is a block diagram illustrating another example verification system 200 in accordance with another embodiment. The verification system 200 can further comprise initiation component 302, machine learning component 304, requesting component 306, re-authentication component 308, rejection component 310, or updating component 312. The initiation component 302 can initiate authentication based on detection, by the machine learning component 304, of irregular patterns of account activities. The machine learning component 304 can analyze account activity data to determine whether an activity has irregular patterns. A determination that the user should be authenticated can be made by the machine learning component 304 if irregular patterns of account activities are detected.

Irregular patterns of account activities can be defined based upon security protocols associated with an account. For example, security protocols could define transactions outside of a predetermined geographical area as irregular pattern of account activity requiring authentication. The initiation component 302 can also initiate authentication based upon requests for access to an account from a different device. For example, upon request by the user 120 to access account A 130 or account B 140 . . . n, as in FIG. 1, from an unregistered device, the initiation component 302 can initiate authentication. Upon initiation of authentication, the generating and sending component 202, can generate and send a message (e.g., an authentication request) to the device 125 associated with the user 120, wherein the message requests a content-based response from the user 120 to authenticate the user 120.

The receiving component 204 can receive the content-based response from the user 120 in reply to the message (e.g., the authentication request), wherein the content-based response can comprise SMS metadata, emoji, photo, video, audio, or a combination thereof. The content-based response can also comprise photo metadata, video metadata, and audio metadata. Upon receiving the content-based response by the receiving component 204, the machine learning component 304 can invoke machine learning models to determine whether there is a match between the content-based response and the response key preselected by the user 120. The machine learning component 304 can analyze patterns within the content-based response to confirm whether the content-based response matches the response key preselected by the user 120. The machine learning component 304 can also analyze available metadata in the content-based response (e.g., SMS metadata, MMS metadata, photo metadata, video metadata, or audio metadata) to determine whether the pattern of the response matches that of the user 120. The SMS metadata and MMS metadata can reveal information as to the geographical location, date, and time of the content-based response, which can be used by the machine learning component 304 to determine whether the user 120 should be authenticated. In addition, the photo metadata, video metadata, and audio metadata can reveal additional information especially if the photo, video, and audio is imported from another device not associated with the user 120.

Additionally, the requesting component 306 can request different types of content-based response depending on security level of the account activity or type of account. The requesting component 306 can request a more complex content-based response for an account with higher security level. For example, an account with more personal information or a credit card account would warrant higher security level than a social media account.

If no match is determined, however, the re-authentication component 308 can re-authenticate the user 120. If the content-based response does not cause a denial but also does not create a match with the response key, the re-authentication component 308 can re-authenticate the user 120. Re-authentication can also occur after a predetermined amount of time since logging in (e.g., the user 120 has been logged in to the account for a predetermined amount of time) to ensure the user 120 is still active in the account and still the authorized user. As with the authentication process, the generating and sending component 202 can also generate and send the user 120 another message (e.g., a re-authentication request) to the device 125 associated with the user 120, wherein the message requests a content-based response from the user 120 to re-authenticate the user 120.

If the machine learning component 304 determines there is a match between the content-based response and the response key, the authentication component 206 can authenticate the user 120 thereby authorizing the transaction or account activity. If the machine learning component 304 determines there is not a match between the content-based response and the response key, authentication can be denied by the rejection component 310. More specifically, the rejection component 310 can deny authentication based on a determination that the content-based response from the user 120 does not match the response key preselected by the user. A determination whether there is a match between the content-based response and the response key can be based on analyzing the content-based response against the response key as well as analyzing the metadata of the content-based response.

If there is a denial of authentication, the machine learning component 304 can analyze the data to determine whether there is also a breach of security. If there is a breach of security, the updating component 312 can update the response key by requesting the user 120 to create an updated response key, e.g., a new response key. The updating component 312 can also update the response key by requesting an updated response key after a predetermined amount of time has passed since the response key was made. The response key can also be updated by the updating component 312 upon input from (e.g., initiation by) the user 120.

Figure 4:
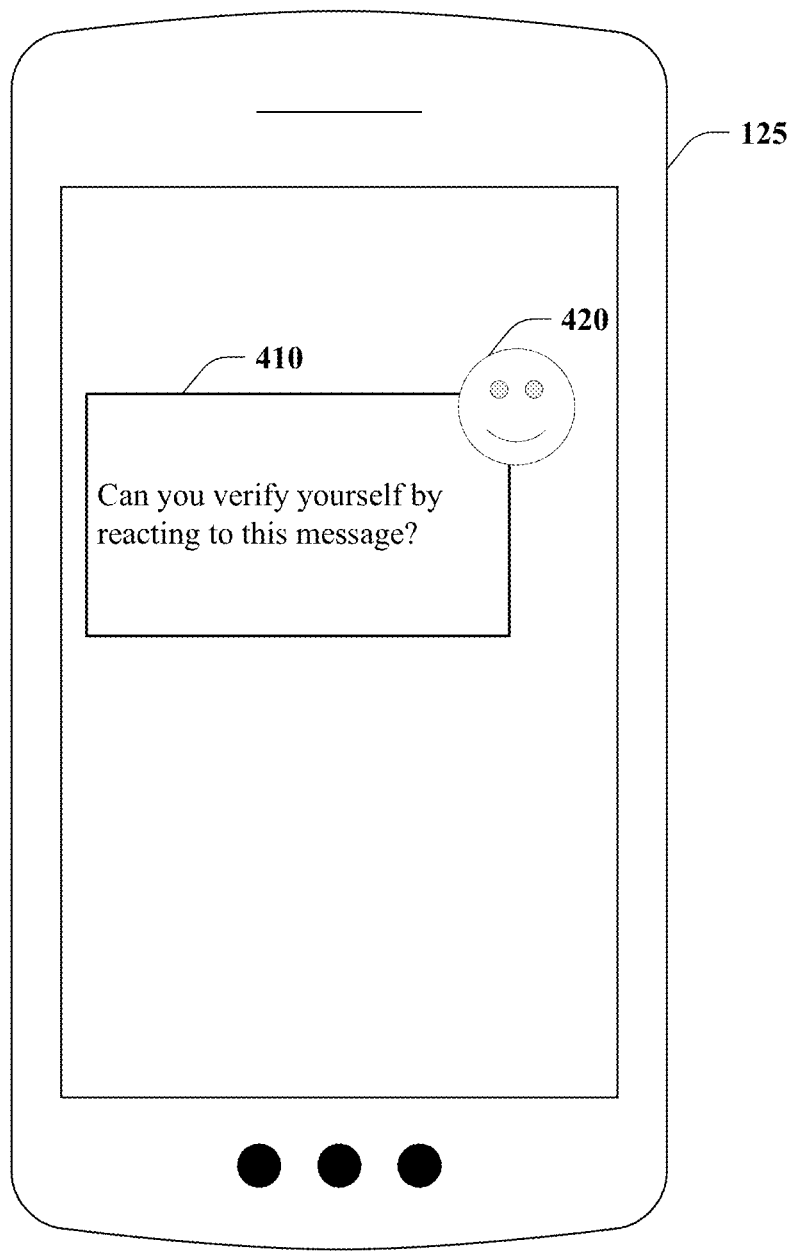
FIG. 4 illustrates an example of a device displaying an authentication request.
Figure 5:
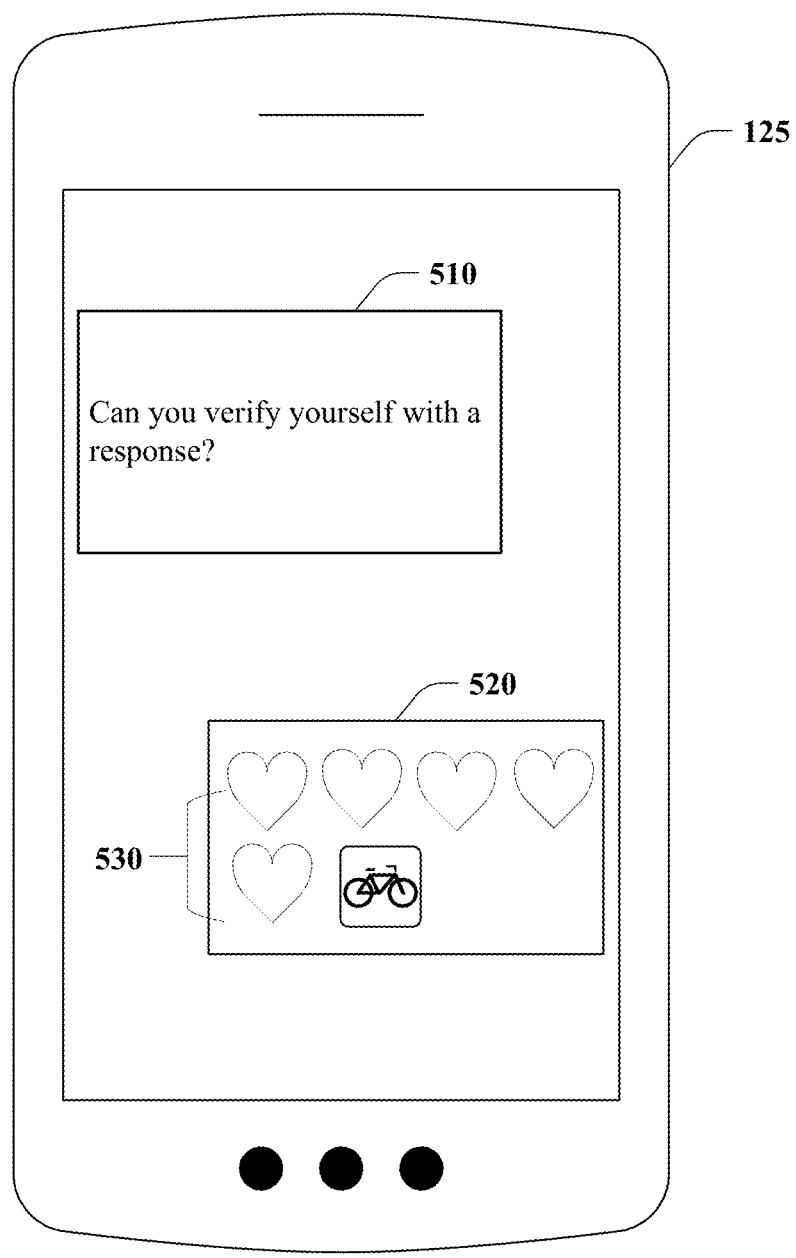
FIG. 5 illustrates an example of a device displaying another authentication request.

FIGS. 4 and 5 illustrate examples of the device 125 displaying authentication requests. Although FIGS. 4 and 5 illustrate the device 125 as a smart phone, the device 125 can be another electronic device such as, but not limited to, a phone, a tablet, a laptop, a personal computer, an IoT (Internet of Things) device, etc. FIGS. 4 and 5 illustrate a user interface (UI) on the device 125.

In FIG. 4, the device 125 displays an authentication request 410 and a content-based response 420. The device 125 can receive and display the authentication request 410 (e.g., a message) generated and sent by the generating and sending component 202. The authentication request 410 requests a content-based response from the user 120 to authenticate the user 120 by inquiring, "Can you verify yourself by reacting to this message?" The authentication request 410 is a non-limiting example and can also be worded differently or presented differently. In response to the authentication request 410, the user 120 reacted to the authentication request 410 with the content-based response 420, which is a smiley face. The metadata can include information that the content-based response 420 is a reaction to the authentication request 410, rather than a separate message. In some embodiments, the metadata can include SMS metadata, MMS metadata, photo metadata, video metadata, audio metadata, or a combination thereof. The machine learning component 304 can map and analyze the information in the metadata to learn the pattern of the user 120.

FIG. 5 illustrates the device 125 displaying authentication request 510 and a content-based response 520 that includes a series of emojis 530. The device 125 can receive and display the authentication request 510 (e.g., a message) generated and sent by the generating and sending component 202. The authentication request 510 requests a content-based response from the user 120 to authenticate the user 120 by inquiring, "Can you verify yourself with a response?" The authentication request 510 can also be phrased or presently in various ways.

In response to the authentication request 510, the user 120 responded in a separate message with the content-based response 520, which is a series of emojis 530 including a consecutive sequence of five hearts and a bicycle. The response key setting up what is acceptable as a content-based response can be unlimited. Content—based response 520 is a non-limiting example showing that a response key can include multiple emojis (e.g., a string of emojis). The purpose of the response key is to make it easy for the user 120 to remember the security key (e.g., what is acceptable as a response key) and harder for an unauthorized user to figure out the pattern of the content-based response. In order to make the content-based response more difficult for an unauthorized user to guess, security protocols can require that a response key cannot be repeated. For example, security protocols can require that a predetermined length of time has passed or a predetermined number of content-based response has been used before a content-based response can be used again. Machine learning component 304 can be employed to determine whether a content-based response matches the response key created by the user 120.

With reference to FIGS. 6-10, example methods 600-1000 are depicted. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the methods 600-1000 are described in conjunction with specific examples for explanation purposes.

Figure 6:
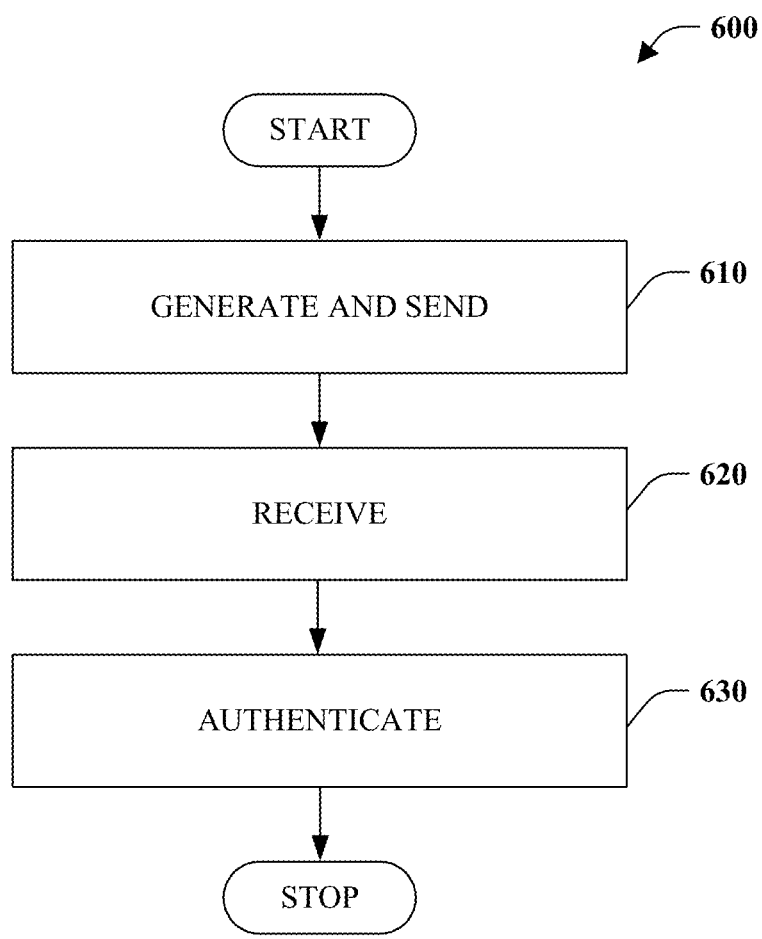
FIG. 6 is a flow diagram illustrating an authentication method.

FIG. 6 is a flow diagram illustrating an authentication method 600. At 610, the authentication method 600 can comprise generating and sending, by the generating and sending component 202, a message (e.g., an authentication request) to the device 125 associated with the user 120 based on an initiated request from the user 120 and a determination (e.g., by the machine learning component 304) the user 120 should be authenticated. The initiated request from the user 120 can be an act by the user 120 that triggers a determination that the user 120 should be authenticated. The initiated request can be, for example, an act of making a transaction on an account, changing profile information in an account, requesting customer service 150 to send an authentication request associated with an account instead of providing authenticating information over a phone call, etc. The message (e.g., an authentication request) can request a content-based response from the user 120 to authenticate the user 120.

At 620, the authentication method 600 can comprise receiving, by the receiving component 204, the content-based response from the user 120 in reply to the message (e.g., the authentication request). The content-based response can comprise SMS metadata, emoji, photo, video, audio, or a combination thereof. The content-based response can also comprise MMS metadata, photo metadata, video metadata, and audio metadata. At 630, the authentication method 600 can comprise authenticating, by the authentication component 206, the user 120 based on a determination of a confirmed match between the content-based response from the user 120 and a response key preselected by the user 120.

Figure 7:
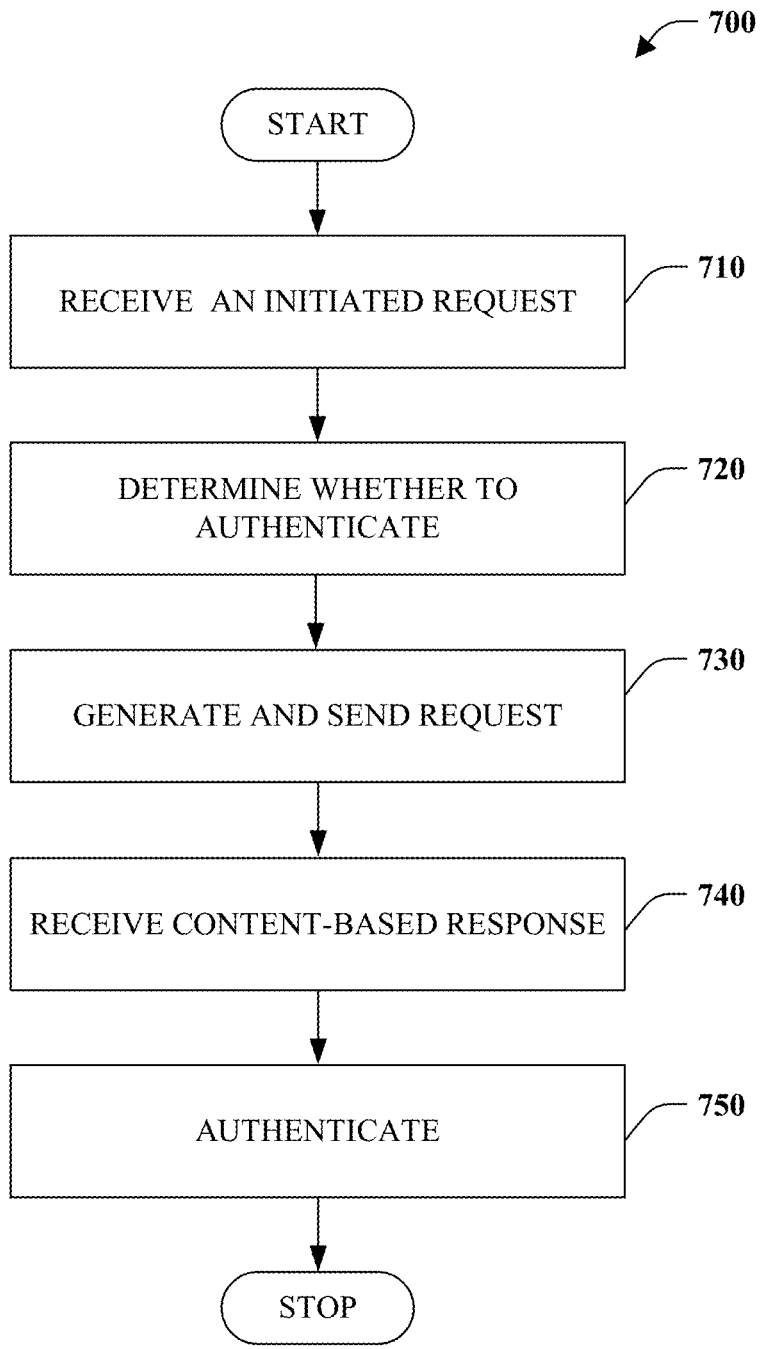
FIG. 7 is a flow diagram illustrating an authentication method based on an initiated request by a user.

FIG. 7 is a flow diagram illustrating an authentication method 700 based on an initiated request by the user 120. At 710, the authentication method 500 can comprise receiving, by the receiving component 204, an initiated request from the user 120. At 720, the authentication method 700 can comprise determining, by the machine learning component 304, the user 120 should be authenticated based on the initiated request. At 730, the authentication method 700 can comprise generating and sending, by the generating and sending component 202, a message to the device 125 associated with the user, wherein the message requests a content-based response from the user 120 to authenticate the user 120. At 740, the authentication method 700 can comprise receiving, by the receiving component 204, the content-based response from the user 120 in reply to the message, wherein the content-based response can comprise SMS metadata, emoji, photo, video, audio, or combination thereof. The content-based response can also comprise photo metadata, video metadata, or audio metadata. At 750, the authentication method can comprise authenticating, by the authentication component 206, the user 120 based on a determination of a confirmed match between the content-based response from the user 120 and a response key preselected by the user 120.

Figure 8:
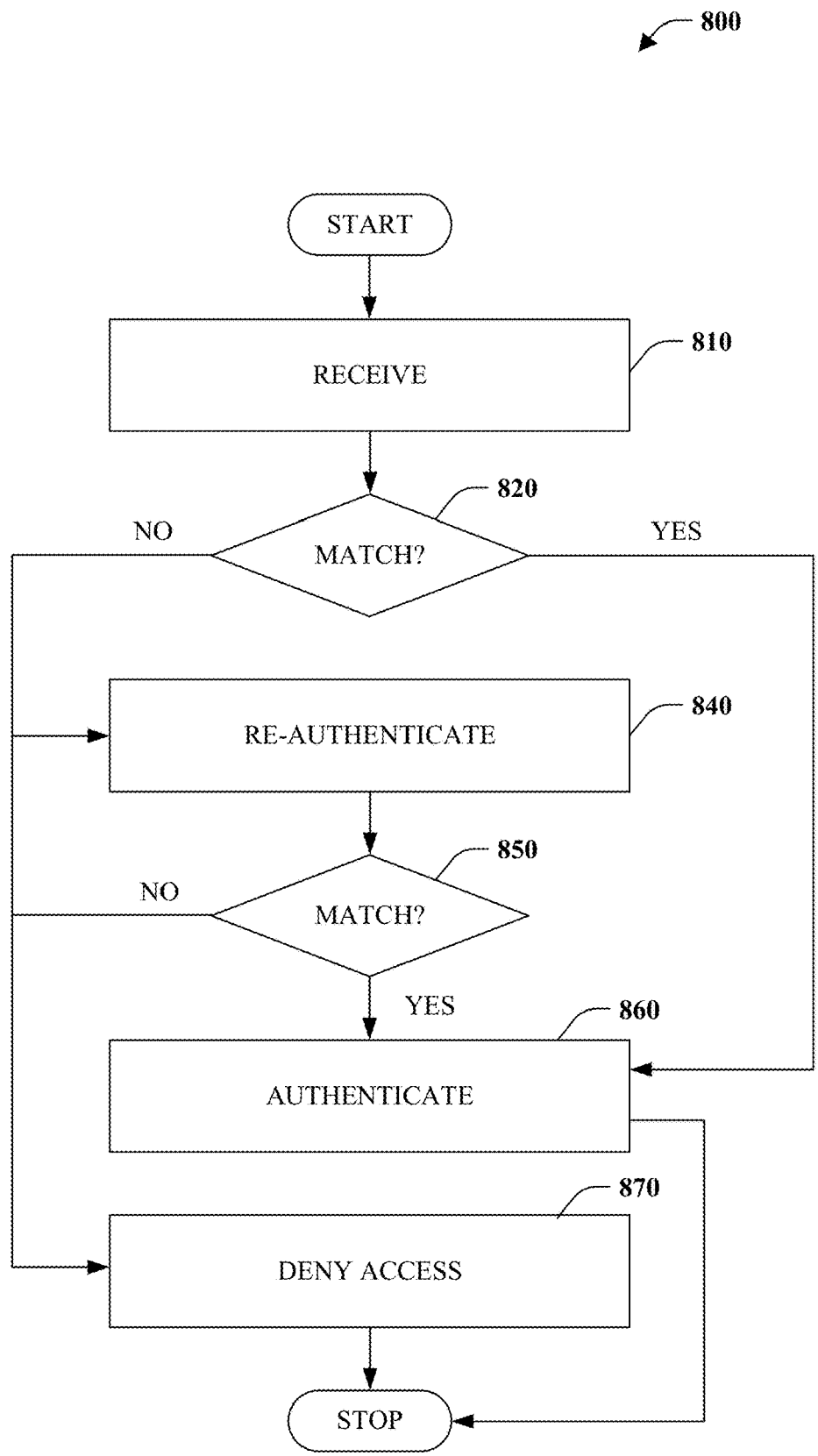
FIG. 8 is a flow diagram illustrating a re-authentication method.

FIG. 8 is a flow diagram illustrating a re-authentication method 800. At 810, the re-authentication method 800 can comprise receiving, by the receiving component 204, the content-based response from the user 120 in response to an authentication request. At 820, the re-authentication method 800 can comprise determining, by the machine learning component 304, whether the content-based response matches the response key. If yes, the process continues at 860 to authenticate the user 120. If no, the process proceeds to 840 to re-authenticate or to 870 to deny access. The machine learning component 304 can analyze content-based response and the metadata in the content-based response to provide a confidence score. At a predetermined confidence threshold, the machine learning component 304 can determine that the user 120 can be authenticated at 860. Below predetermined confidence threshold, the machine learning component 304 can determine that the user 120 is denied access at 870. It is contemplated that there can be a range of predetermined confidence score in which re-authentication at 840 is required.

At 840, the re-authentication method can comprise re-authenticating, by the re-authentication component 308. The re-authentication component 308 can indicate that the user 120 need to be re-authenticated. Upon receiving an indication that the user 120 need to be re-authenticated, the generating and sending component 202 can generate and send a re-authentication request to the user 120, and the receiving component 204 can receive a content-based response from the user 120 for re-authentication.

At 850, the re-authentication method 800 can comprise determining, by the machine learning component 304, whether the content-based response matches the response key. If yes, the process continues at 860 to authenticate the user 120. If no, the process proceeds to 840 to re-authenticate or to 870 to deny access. At 860, the re-authentication method 800 can comprise authenticating, by the authentication component 206, the user 120 based on a determination of a confirmed match between the content-based response from the user 120 and a response key preselected by the user 120. At 870, the re-authentication method 800 can comprise denying access, by the rejection component 310, to the user 120 based on a determination that the identity of the user 120 cannot be verified.

Figure 9:
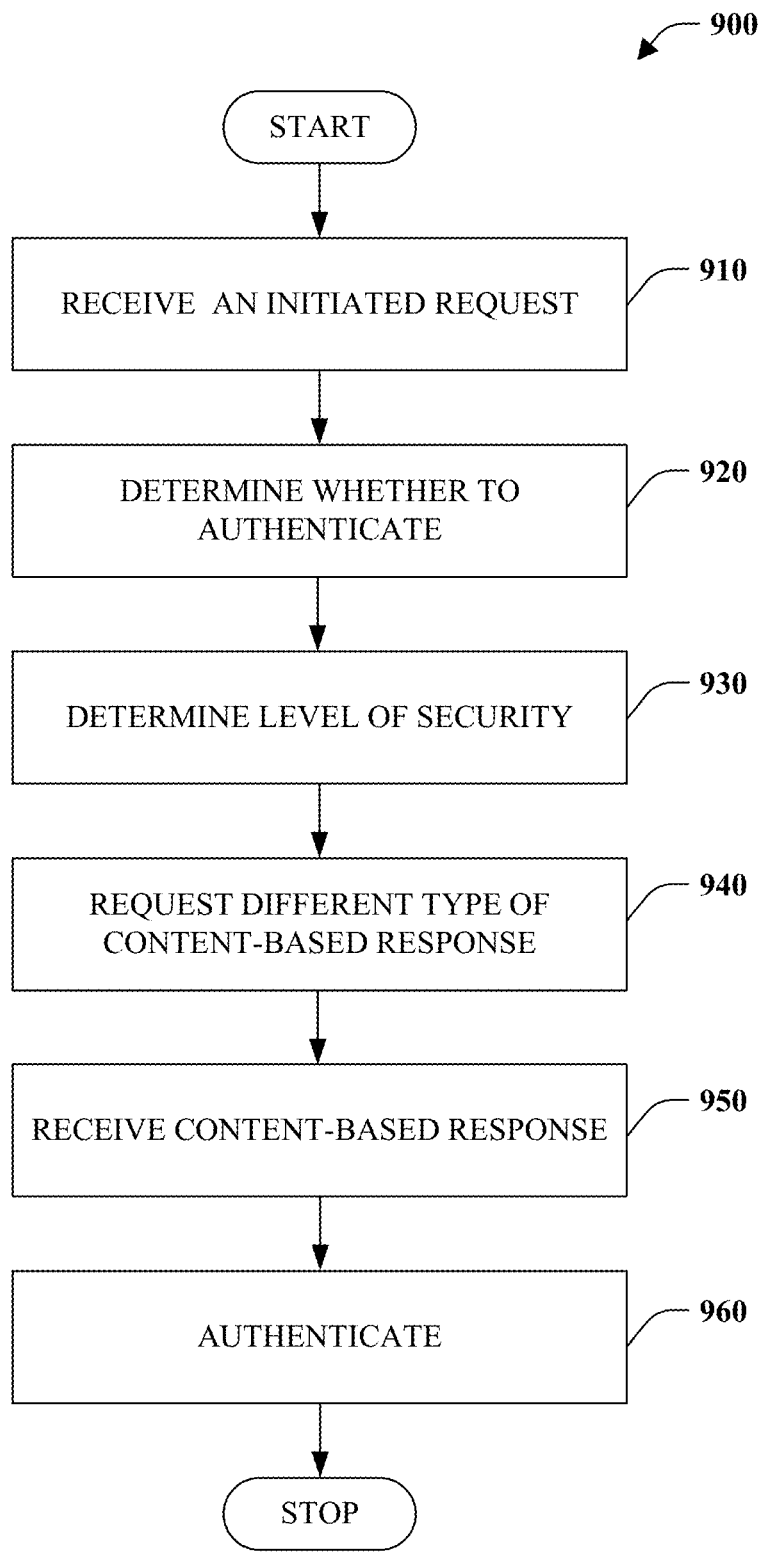
FIG. 9 is a flow diagram illustrating an authentication method based on level of security.

FIG. 9 is a flow diagram illustrating an authentication method 900 based on level of security. At 910, the authentication method 900 can comprise receiving, by the receiving component 204, an initiated request from the user 120. At 920, the authentication method 900 can comprise determining, by the machine learning component 304, whether the user 120 should be authenticated based on the initiated request. At 930, the authentication method 900 can comprise determining, by the machine learning component 304, the level of security of the request based on account activities or type of accounts. At 940, the authentication method 900 can comprise requesting, by the requesting component 306, different type of content-based response depending on security level of account activities or type of account. For example, transactions or activities within a credit card account may require requesting a more complicated content-based response than activities within a social media account such as updating profile information.

At 950, the authentication method 900 can comprise receiving, by the receiving component 204, the content-based response from the user 120 in response to the request for a different type of content-based response. At 960, the authentication method 900 can comprise authenticating, by the authentication component 206, the user 120 based on a determination of a confirmed match between the content-based response from the user 120 and a response key preselected by the user 120.

Figure 10:
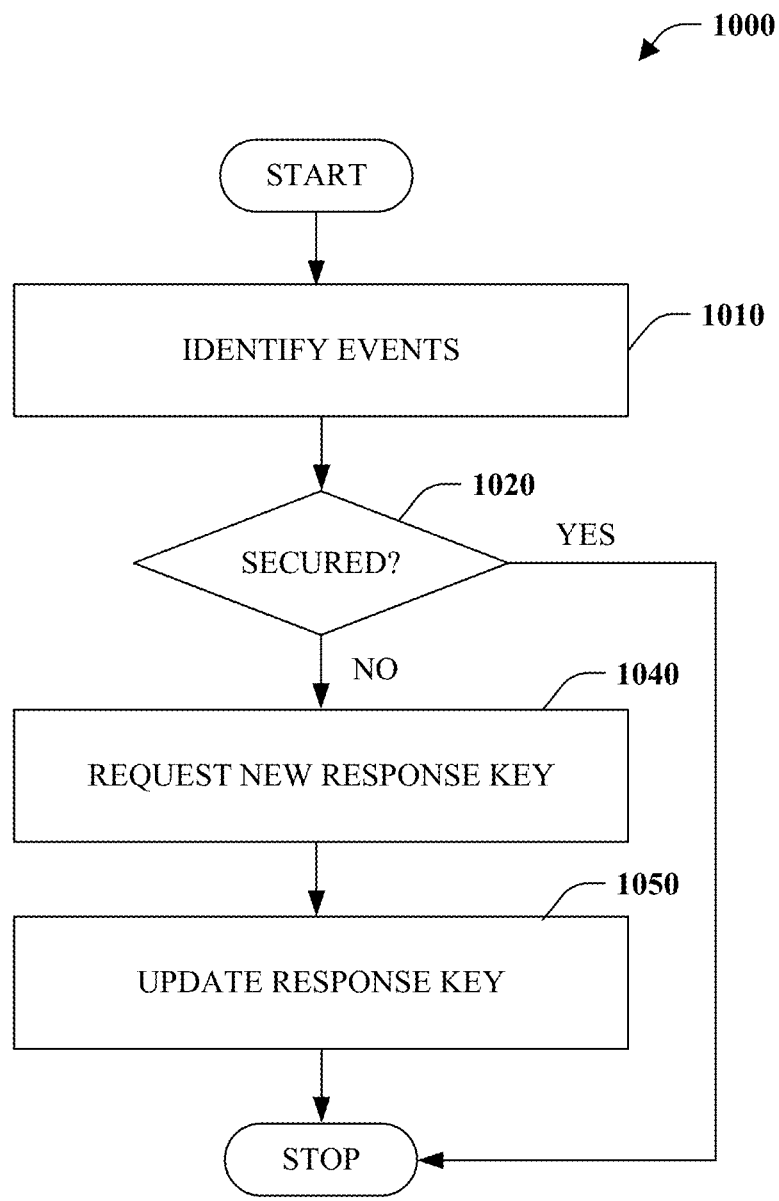
FIG. 10 is a flow diagram illustrating a response key update method.

FIG. 10 is a flow diagram illustrating a response key update method 1000. At 1010, the response key update method 1000 can comprise identifying events that can trigger a response key update. A security breach such as detection of an unauthorized user is an event that can trigger a response key update. A response key update can also be triggered after a predetermined amount of time has passed. A response key update can also be initiated by the user 120. For example, the user 120 can voluntarily submit an updated response key.

At 1020, the response key update method 1000 can comprise determining, by the machine learning component 304, whether the response key is secure. For example, the machine learning component 304 can determine whether the response key is secure based on whether an event has occurred that would trigger a response key update. Detection of access by an unauthorized user, for example, would render the response key unsecure. If yes, the machine learning component 304 determines that the response key is secure, the process ends. If no, the machine learning component 304 determines that the response key is not secure, the process proceeds to 1040.

At 1040, the response key update method 1000 can comprise requesting, by the updating component 312, a new response key. At 1050, the response key update method 1000 can comprise updating, by the updating component 312, the response key with the new response key.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference may be employed to identify a context or an action or may be used to generate a probability distribution over states, for example. An inference may be probabilistic. For example, computation of a probability distribution over states of interest can be based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 11:
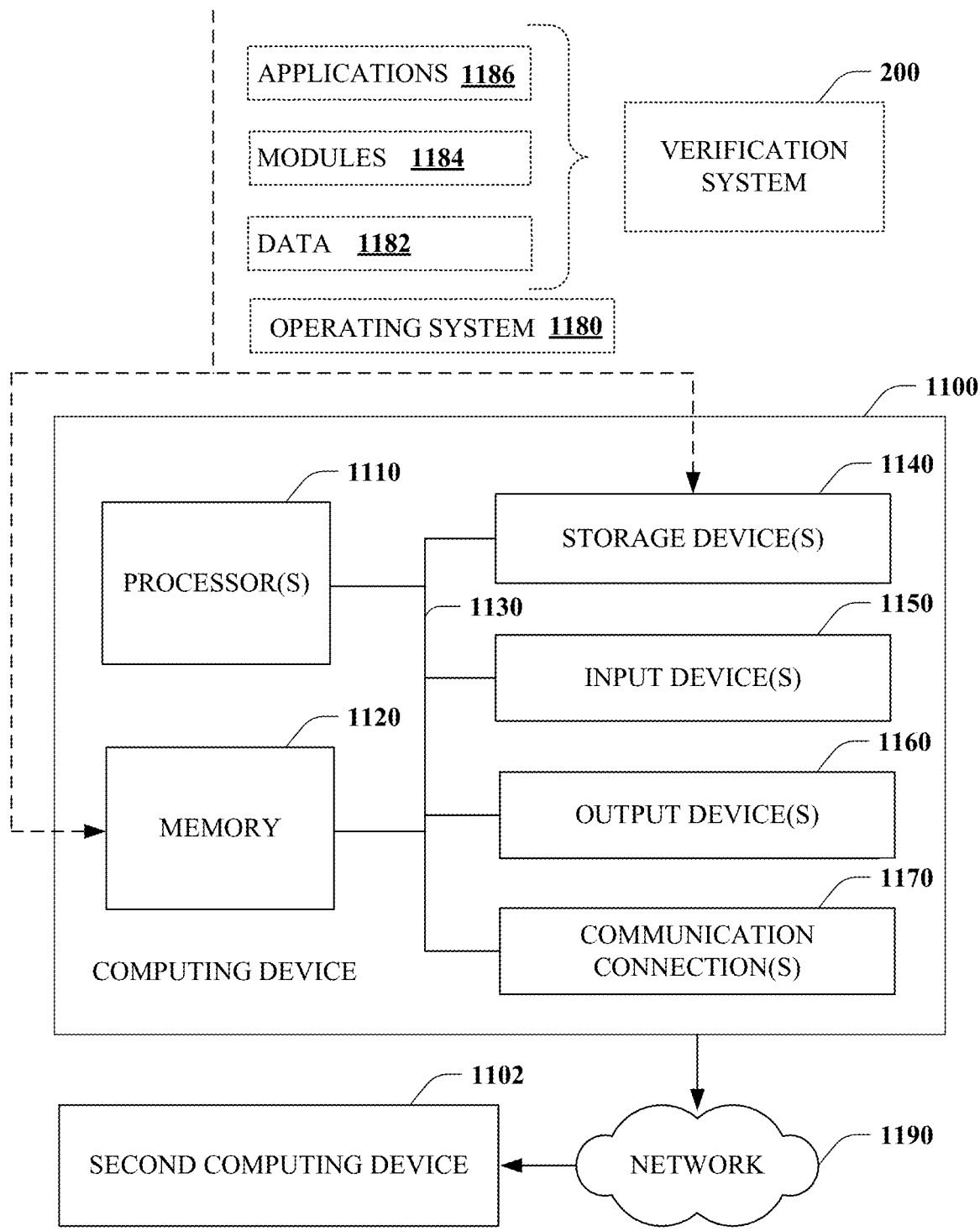
FIG. 11 is a block diagram illustrating a suitable operating environment for aspects of the subject disclosure.

To provide a context for the disclosed subject matter, FIG. 11, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules may be located in one or both of local and remote memory devices.

With reference to FIG. 11, illustrated is an example computing device 1100 (e.g., desktop, laptop, tablet, watch, server, hand-held, programmable consumer or industrial electronics, set-top box, game system, compute node, . . . ). The computing device 1100 includes one or more processor(s) 1110, memory 1120, system bus 1130, storage device(s) 1140, input device(s) 1150, output device(s) 1160, and communications connection(s) 1170. The system bus 1130 communicatively couples at least the above system constituents. However, the computing device 1100, in its simplest form, can include one or more processors 1110 coupled to memory 1120, wherein the one or more processors 1110 execute various computer-executable actions, instructions, and or components stored in the memory 1120.

The processor(s) 1110 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1110 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 1110 can be a graphics processor unit (GPU) that performs calculations concerning digital image processing and computer graphics.

The computing device 1100 can include or otherwise interact with a variety of computer-readable media to facilitate control of the computing device to implement one or more aspects of the disclosed subject matter. The computer-readable media can be any available media accessible to the computing device 1100 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 1100. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 1120 and storage device(s) 1140 are examples of computer-readable storage media. Depending on the configuration and type of computing device, the memory 1120 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 1100, such as during start-up, can be stored in non-volatile memory, while volatile memory can act as external cache memory to facilitate processing by the processor(s) 1110, among other things.

The storage device(s) 1140 include removable/non-removable, volatile/non-volatile storage media for storage of vast amounts of data relative to the memory 1120. For example, storage device(s) 1140 include, but are not limited to, one or more devices such as a magnetic or optical disk drive, floppy disk drive, flash memory, solid-state drive, or memory stick.

Memory 1120 and storage device(s) 1140 can include, or have stored therein, operating system 1180, one or more applications 1186, one or more program modules 1184, and data 1182. The operating system 1180 acts to control and allocate resources of the computing device 1100. Applications 1186 include one or both of system and application software and can exploit management of resources by the operating system 1180 through program modules 1184 and data 1182 stored in the memory 1120 and/or storage device(s) 1140 to perform one or more actions. Accordingly, applications 1186 can turn a general-purpose computer 1100 into a specialized machine in accordance with the logic provided thereby.

All or portions of the disclosed subject matter can be implemented using standard programming and/or engineering techniques to produce software, firmware, hardware, or any combination thereof to control the computing device 1100 to realize the disclosed functionality. By way of example and not limitation, all or portions of the verification system 200 can be, or form part of, the application 1186, and include one or more modules 1184 and data 1182 stored in memory and/or storage device(s) 1140 whose functionality can be realized when executed by one or more processor(s) 1110.

In accordance with one particular embodiment, the processor(s) 1110 can correspond to a system on a chip (SOC) or like architecture including, or in other words integrating, both hardware and software on a single integrated circuit substrate. Here, the processor(s) 1110 can include one or more processors as well as memory at least similar to the processor(s) 1110 and memory 1120, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the verification system 200 and/or functionality associated therewith can be embedded within hardware in a SOC architecture.

The input device(s) 1150 and output device(s) 1160 can be communicatively coupled to the computing device 1100. By way of example, the input device(s) 1150 can include a pointing device (e.g., mouse, trackball, stylus, pen, touchpad, . . . ), keyboard, joystick, microphone, voice user interface system, camera, motion sensor, and a global positioning satellite (GPS) receiver and transmitter, among other things. The output device(s) 1160, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1150 and output device(s) 1160 can be connected to the computing device 1100 by way of wired connection (e.g., bus), wireless connection (e.g., Wi-Fi, Bluetooth, . . . ), or a combination thereof.

The computing device 1100 can also include communication connection(s) 1170 to enable communication with at least a second computing device 1102 utilizing a network 1190. The communication connection(s) 1170 can include wired or wireless communication mechanisms to support network communication. The network 1190 can correspond to a local area network (LAN) or a wide area network (WAN) such as the Internet. The second computing device 1102 can be another processor-based device with which the computing device 1100 can interact. In one instance, the computing device 1100 can execute a verification system 200 for a first function, and the second computing device 1102 can execute a verification system 200 for a second function in a distributed processing environment. Further, the second computing device can provide a network-accessible service that stores source code, and encryption keys, among other things that can be employed by the verification system 200 executing on the computing device 1100.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system for increasing security and decreasing unauthorized account access by utilizing SMS metadata and emoji as a basis for identity verification in response to an authorization request while cellular data or Wi-Fi is not available, comprising:
  one or more processors and memory comprising instructions that, when executed by the one or more processors, cause the system to:
    receive, from a device associated with a user having a secure account, a response key created by the user, wherein the response key comprises a preselected set of content-based responses to be used to authenticate the user, wherein the preselected set of content-based responses comprises preselected SMS metadata, one or more preselected emojis, preselected photo metadata, preselected video metadata, and preselected audio metadata;
    generate and send a message to the device based on an initiated request from the user and a determination the user should be authenticated, wherein the message requests a content-based response from the user to authenticate the user;
    receive the content-based response from the user in reply to the message, wherein the content-based response comprises at least one of short message service (SMS) metadata, an emoji, photo metadata, video metadata, or audio metadata;
    determine a confirmed match between the content-based response from the user and the response key, wherein one or more machine learning models are trained to compare the at least one of the SMS metadata, the emoji, the photo metadata, the video metadata, or the audio metadata to the preselected set of content-based responses comprising the preselected SMS metadata, the one or more preselected emojis, the preselected photo metadata, the preselected video metadata, and the preselected audio metadata to determine the confirmed match; and
    authenticate the user based on the determination of the confirmed match.

2. The system of claim 1, wherein the instructions further cause the system to:
  initiate authentication based on detection of irregular patterns of account activities.

3. The system of claim 1, wherein the response key further comprises a set of rules from which the content-based response is compared or matched.

4. The system of claim 3, wherein the audio metadata is a voice pattern, voice frequency, or voice content.

5. The system of claim 3, wherein the instructions further cause the system to:
  request a different type of content-based response based on a security level of account activities or type of account.

6. The system of claim 3, wherein the instructions further cause the system to:
  if responsive to determining that the content-based response does not cause a denial and does not match the response key, re-authenticate the user.

7. The system of claim 1, wherein the instructions further cause the system to:
  update the response key after a predetermined amount of time, after a breach of security, or upon input from the user.

8. A method, comprising:
  receiving, from a device associated with a user having a secure account, a response key comprising a preselected set of content-based responses to be used to authenticate the user, wherein the preselected set of content-based responses comprises preselected short message service (SMS) metadata, one or more preselected emojis, preselected photo metadata, preselected video metadata, and preselected audio metadata;
  generating and sending a message to the device based on an initiated request from the user and a determination the user should be authenticated, wherein the message requests a content-based response from the user to authenticate the user;
  receiving the content-based response from the user in reply to the message, wherein the content-based response comprises at least one of SMS metadata, an emoji, photo metadata, video metadata, or audio metadata;
  determining a confirmed match between the content-based response from the user and the response key, wherein one or more machine learning models are trained to compare the at least one of the SMS metadata, the emoji, the photo metadata, the video metadata, or the audio metadata to the preselected set of content-based responses to determine the confirmed match; and
  authenticating the user based on the determination of the confirmed match.

9. The method of claim 8, further comprising:
  initiating authentication based on detection of irregular patterns of account activities.

10. The method of claim 8, further comprising:
  requesting a different type of content-based response based on a security level of account activities or type of account.

11. The method of claim 8, further comprising:
  receiving, based on an additional message sent to the device for authenticating the user, an additional content-based response from the user in reply to the additional message, wherein the additional content-based response comprises at least one of SMS metadata, an emoji, photo metadata, video metadata, or audio metadata;
  if determining that the additional content-based response does not cause a denial and does not match the response key; and
  re-authenticating the user based on the determination that the additional content-based response does not cause a denial and does not match the response key.

12. The method of claim 8, further comprising:
  updating the response key after a predetermined amount of time, after a breach of security, or upon input from the user.

13. The method of claim 8, wherein the initiated request from the user is received while cellular data or Wi-Fi is not available.

14. The method of claim 8, wherein multimedia messaging (MMS) is unavailable.

15. One or more non-transitory computer-readable storage media comprising instructions that, in response to execution, cause one or more processors to perform operations comprising:
- receiving, from a device associated with a user having a secure account, a response key created by the user, wherein the response key comprises a preselected set of content-based responses to be used to authenticate the user, wherein the preselected set of content-based responses comprises preselected short message service (SMS) metadata, one or more preselected emojis, preselected photo metadata, preselected video metadata, and preselected audio metadata;
- receiving an initiated request from the user;
- determining the user should be authenticated based on the initiated request;
- generating and sending a message to the device, wherein the message requests a content-based response from the user to authenticate the user;
- receiving the content-based response from the user in reply to the message, wherein the content-based response comprises at least one of SMS metadata, an emoji, photo metadata, voice metadata, or audio metadata;
- determining a confirmed match between the content-based response from the user and the response key, wherein one or more machine learning models are trained to compare the at least one of the content-based response to the preselected set of content-based responses to determine the confirmed match; and
- authenticating the user based on the determination of the confirmed match.

16. The one or more non-transitory computer-readable storage media of claim 15, wherein the operations further comprise:
- initiating authentication based on detection of irregular patterns of account activities.

* * * * *